United States Patent
Dykstra

[11] Patent Number: 6,155,239
[45] Date of Patent: Dec. 5, 2000

[54] FUEL VAPOR SYSTEM

[76] Inventor: Franklyn D. Dykstra, N4786 Lake Shore Dr., Princeton, Wis. 54968

[21] Appl. No.: 09/480,357

[22] Filed: Jan. 10, 2000

Related U.S. Application Data

[60] Provisional application No. 60/119,048, Feb. 8, 1999.

[51] Int. Cl.[7] .................................................. F02M 37/04
[52] U.S. Cl. ........................................... 123/522; 123/525
[58] Field of Search ..................................... 123/522, 525, 123/516, 519, 520, 521

[56] References Cited

U.S. PATENT DOCUMENTS

| | | | |
|---|---|---|---|
| 3,790,139 | 2/1974 | Stephenson | 123/522 |
| 3,800,533 | 4/1974 | Zankowski | 123/522 |
| 3,800,768 | 4/1974 | Rhodes | 123/522 |
| 4,011,847 | 3/1977 | Fortino | 123/522 |
| 4,312,317 | 1/1982 | Jewett | 123/522 |
| 4,499,885 | 2/1985 | Weissenbach | 123/525 |
| 4,681,081 | 7/1987 | Lapan | 123/522 |
| 5,482,024 | 1/1996 | Elliot | 123/522 |
| 5,850,821 | 12/1998 | Curtis | 123/522 |

*Primary Examiner*—Carl S. Miller
*Attorney, Agent, or Firm*—Donald Cayen

[57] ABSTRACT

This system uses the fuel tank not only to store fuel, but as a generator to create a raw overly rich air/fuel mixture through the use of a bubble pan in the bottom of the fuel tank. This raw air/fuel mixture is then measured by sensors linked to a computer and additional air or fuel may be added by computer demand. Thus the computer can completely regulate the air/fuel mixture at all times in an ever changing way to meet climatic, engine, and load conditions. This total control of the air/fuel mixture in flexible and ever changing way should result in optimum combustion, a clean burn, extreme economy, and maximum engine power. This then is a system of computer controlled mixture.

13 Claims, 2 Drawing Sheets

FUEL VAPOR SYSTEM

This is a continuation-in-part of U.S. patent application Ser. No. 60/119,048 filed Feb. 8, 1999.

BACKGROUND OF THE INVENTION

1. Field of the Invention

This invention pertains to fuel delivery systems, and more particularly to systems for delivering gaseous fuel to internal combustion engines.

2. Description of the Prior Art

Various types of fuel delivery systems have been developed for internal combustion engines. For example, carburetors have been in use for many years and are now highly refined. Similarly, direct fuel injection systems are well known and in widespread use.

A common characteristic of prior fuel delivery systems is that the fuel is vaporized at locations either within or very close to the combustion cylinders. In carburetor systems, the carburetor is invariably located adjacent the engine intake manifold. In direct injection systems, the fuel is not vaporized until it is actually inside the combustion cylinder. In both types of systems, therefore, a pump is required to deliver liquid fuel from a storage tank to the engine.

Despite their general suitability for automotive applications, both carburetor and direct injection systems have certain disadvantages. Both types of systems require high accuracy, and therefore expensive, components for proper operation. Especially with direct injection systems, those components include costly high pressure injector pumps. Both carburetor and direct injection systems are highly susceptible to failure from dirt, moisture, and other contaminants, and servicing a failed system requires skill and unproductive down time. In addition, the prior systems are not able to readily change the air/fuel ratio of the vaporized fuel.

Thus, notwithstanding past technological developments in automotive fuel systems, further refinements to fuel delivery is highly desirable.

SUMMARY OF THE INVENTION

In accordance with the present invention, a fuel vapor system is provided that more efficiently and economically delivers fuel to internal combustion engines than prior systems. This is accomplished by apparatus that includes a fuel vapor generator located remote from the engine.

According to one aspect of the invention, the fuel vapor generator comprises a reservoir having an air inlet, a liquid fuel inlet, and a fuel vapor outlet. The air inlet is open to the atmosphere when the engine is operating but is closed when the engine is not in operation. The fuel inlet is closed to the atmosphere when the engine is in operation. The fuel vapor outlet is connected by a suitable fuel vapor passage to the intake manifold of the engine. A liquid fuel line with a small fuel pump leads from the reservoir to an auxiliary fuel inlet in the fuel vapor passage. There is also an auxiliary air inlet in the fuel vapor passage. Preferably, the auxiliary air inlet is upstream of the auxiliary fuel inlet.

Submerged in the fuel near the bottom of the reservoir is a bubble pan. The bubble pan has a large number of very small holes in it. The bubble pan is connected to the air inlet by a tube.

A number of sensors are present in the fuel vapor passage between the reservoir and the engine. A first sensor is located upstream of the auxiliary air inlet. A second sensor is located downstream of the auxiliary air inlet and the auxiliary fuel inlet. A third sensor is located in the fuel vapor passage upstream of the engine manifold. Additional sensors may be used in the engine and engine manifold. Another sensor monitors atmospheric conditions. All the sensors are connected to a computer.

When the engine is started, the engine produces a vacuum in the fuel vapor passage and the reservoir. The air inlet to the reservoir opens to allow atmospheric air to flow to the bubble pan. The atmospheric air is diffused into myriad bubbles that rise through the fuel in the reservoir. Some fuel vaporizes in the air bubbles such that a fuel vapor is created in a space in the reservoir above the fuel. The fuel vapor is drawn from the reservoir into the fuel vapor passage and toward the engine.

Each sensor measures the air/fuel ratio of the fuel vapor. The measured air/fuel ratio is compared in the computer to a desired ratio. If the air/fuel ratio is too rich at the first sensor, the computer controls an auxiliary air inlet valve to admit air into the fuel vapor passage. The computer controls the auxiliary air inlet valve to open the amount that produces the desired ratio as measured by the second sensor.

If the air/fuel ratio is too lean at the first sensor, the auxiliary air inlet valve remains closed. Instead, the computer controls the fuel pump to inject fuel from the reservoir into the fuel vapor passage at the auxiliary fuel inlet and thus increase the ratio to the desired amount as measured by the second sensor. After the fuel vapor is thoroughly mixed, its ratio is measured a final time before it enters the engine manifold.

The computer determines the desired air/fuel ratio, which changes almost continuously depending on atmospheric conditions and engine speed, load, or temperature. The fuel vapor system delivers a fuel supply to the engine that at all times is optimum for the particular prevailing conditions.

If desired, a blower can be used to positively pump air through the bubble pan and fuel vapor passage to the engine. Also, exhaust gasses from the engine can be used to pre-heat the air entering the reservoir.

The method and apparatus of the invention, using a bubble pan that diffuses atmospheric air into liquid fuel, thus delivers an ideal air/fuel ratio to an internal combustion engine. The sensors and computer assure that the ideal air/fuel ratio is delivered, even though the ideal ratio is constantly changing.

Other advantages, benefits, and features of the present invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
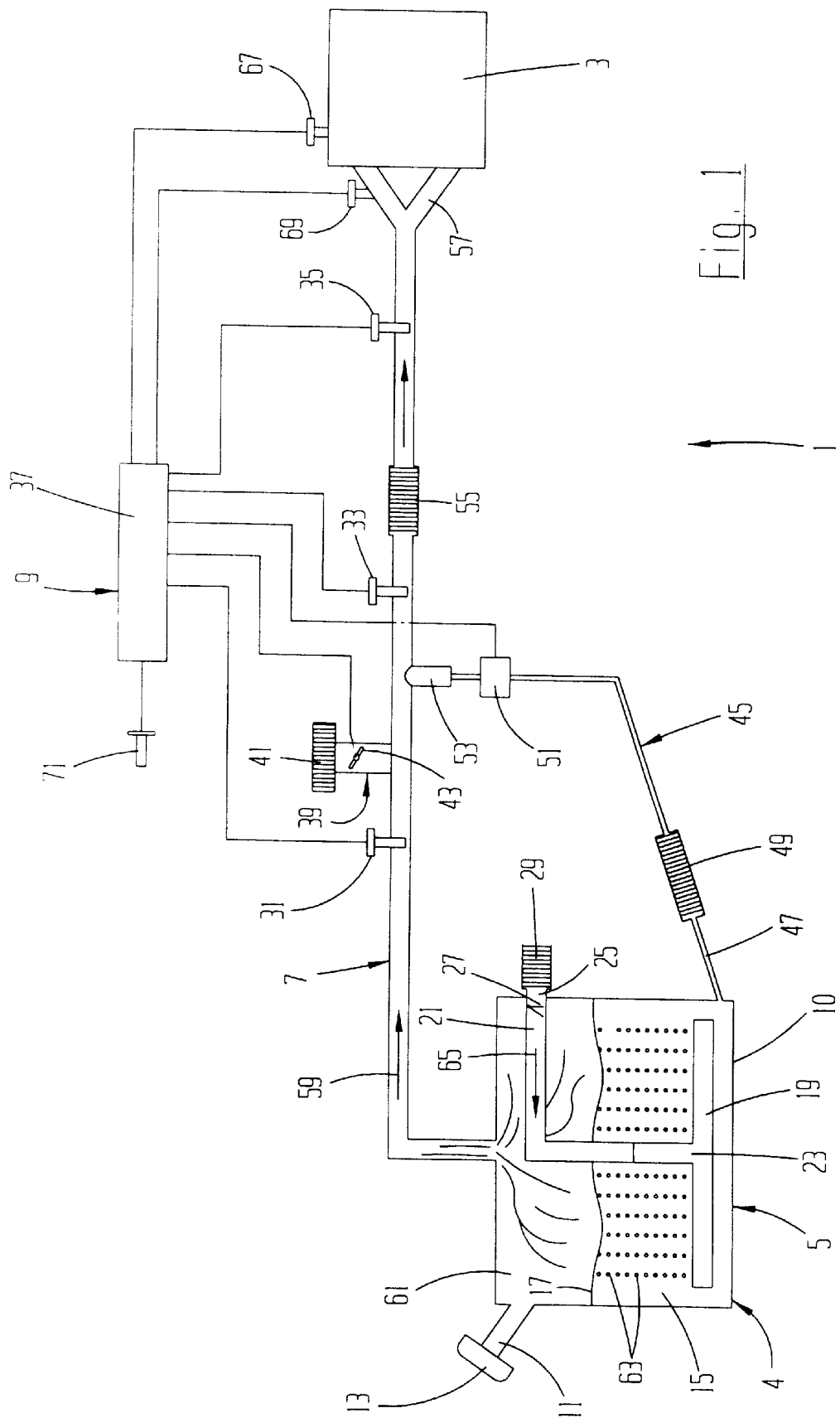
FIG. 1 is a schematic diagram of the fuel vapor system of the invention.

Referring to FIG. 1, a fuel vapor system 1 is illustrated that includes the present invention. The fuel vapor system 1 is particularly useful for delivering gaseous fuel to an internal combustion engine represented at reference numeral 3. The engine 3 may be any of a wide variety of engines as are used in automotive, marine, and aeronautical applications.

The fuel vapor system 1 is comprised of a fuel vapor generator 4, a fuel vapor passage 7, and a control 9 that assures that a proper air/fuel ratio is supplied from the fuel vapor generator to the engine 3. Looking first at the fuel vapor generator 4, it is comprised of a reservoir 5 having a bottom wall 10, and a liquid fuel inlet 11. The fuel inlet 11 is tightly closed by a cap 13 when the engine is in operation. As shown, the reservoir is filled with liquid fuel 15 to a level 17.

Submerged under the fuel 15 in the reservoir 5 is a bubble pan 19. The bubble pan 19 preferably has a size and shape that closely approximates the size and shape of the reservoir bottom wall 10. The bubble pan is formed with a very large number of small holes, not shown. A tube 21 passes through the reservoir and connects at one end 23 to the bubble pan. A second end 25 of the tube 21 is open to the atmosphere. There is a valve 27 and a filter 29 in the tube end 25.

The fuel vapor passage 7 leads from the space 61 in the reservoir 5 above the fuel level 17 to the engine 3. In the fuel vapor passage are sensors 31, 33, and 35, each having the ability to measure the air/fuel ratio at its respective location. Each of the sensors 31, 33, and 35 is connected by a respective electrical line to a computer 37 of the control 9.

Between the sensors 31 and 33 is an auxiliary air inlet 39 to the fuel vapor passage 7. The auxiliary air inlet 39 is open to the atmosphere through an air cleaner 41 and a valve 43. The valve 43 is operated by the computer 37.

Between the auxiliary air inlet 39 and the sensor 33 is the outlet of an auxiliary fuel inlet 45. The auxiliary fuel inlet 45 is comprised of a fuel line 47 connected to the reservoir 5 below the fuel level 17. There is a filter 49 in the fuel line 47. An ejector pump 51 in the fuel line 47 is controlled by the computer. A fuel injector 53 sprays fuel inside the fuel vapor passage 7 in response to operation of the injector pump 51.

There is a combination filter/mixer 55 in the fuel vapor passage 7 between the sensors 33 and 35. At the engine 3, the fuel vapor passage may divide into separate smaller passages at the intake manifold 57.

In operation, the auxiliary air inlet valve 43 is closed, and the injector pump 51 is inoperative when the engine 3 is started. The valve 27 of the air inlet tube 21 is also closed at engine startup. The engine creates a vacuum at the intake manifold 57 when the engine starts. The vacuum draws fuel vapors from the space 61 in the reservoir 5 in a downstream direction 59 to the engine 3. The partial vacuum in the reservoir space 61 above the fuel level 17 causes air from the air inlet tube 21 to be drawn by means of numerous small bubbles 63 through the bubble pan 19 and through the fuel 15 to the reservoir space 61. The air movement as it is drawn from the air inlet tube 21 in the direction of arrow 65 automatically opens the valve 27. The numerous small bubbles 63 agitate the fuel 15 and cause it to evaporate into the space 61. The fuel vapors are thus continuously produced and drawn in the downstream direction 59 to the engine 3.

Reference numerals 67 and 69 represent typical sensors in the engine 3 and intake manifold 57. The sensors 67 and 69 sense various instantaneous operating conditions of the engine that are affected by the air/fuel ratio of the fuel vapor. Reference numeral 71 represents a sensor that monitors atmospheric conditions such as temperature, humidity, and barometric pressure. Other sensors, not shown, feed engine related data such as speed and gear ratio to the computer 37. Data from the sensors 67, 69, 71, and others is processed by the computer to calculate the ideal air/fuel ratio for the engine under the particular operating conditions at each moment.

The ideal air/fuel ratio as calculated by the computer 37 is compared with the actual ratio leaving the reservoir 5 as measured by the sensor 31. If the actual air/fuel ratio as measured by the sensor 31 is too rich, the computer signals the auxiliary air inlet valve 43 to open. As a result, atmospheric air enters the fuel vapor passage 7 to dilute the fuel vapor. The corrected ratio is measured again by the sensor 33 for comparison with the ideal ratio from the computer. The computer operates the auxiliary air inlet valve as much as necessary until the air/fuel ratio sensed by the sensor 33 matches the ideal ratio from the computer.

If the air/fuel ratio as measured by the sensor 31 is too lean compared with the ideal ratio set by the computer 37, the computer signals the fuel injection pump 51 to operate and inject liquid fuel into the fuel vapor passage 7. The rate of fuel injection is changed until the air/fuel ratio sensed by the sensor 33 matches the ratio determined by the computer. The fuel vapor passes through the filter/mixer 55, after which the air/fuel ratio is measured a final time by the sensor 35. If the sensor 35 measures any variations in the fuel vapor passage 7 downstream of the sensor 33, the computer controls the auxiliary air inlet valve 43 or the fuel injector pump 51 to make the necessary final adjustments. The fuel vapor system 1 is thus capable of changing the actual air/fuel ratio almost instantaneously to suit varying engine and atmospheric conditions.

Upon engine shutdown, the air inlet valve 27 automatically closes. The computer 37 controls the auxiliary air inlet valve 43 to close. In that way, fuel vapor remains in the fuel vapor passage 7 and reservoir space 61, ready to enter the engine 3 at subsequent engine startup.

It is a feature of the invention that the computer 37 can be programmed to set a desired air/fuel ratio that is the most suitable for the instantaneous operating and atmospheric conditions. For example, under certain conditions a fixed air/fuel ratio of 15/1 might be ideal. In that case, the fuel vapor system 1 will always deliver fuel to the engine 3 at a 15/1 ratio. On the other hand, for experimental or other reasons the computer can be programmed to call for any fixed or variable ratio, such as 20/1 or 30/1. In that manner, it is possible through computer programming to easily experiment to determine actual optimum ratios for all varied conditions, which change moment by moment.

Evaporation of the fuel 15 in the reservoir 5 is a cooling process. To increase the efficiency of the engine 3 and the fuel vapor system 1, it may be desirable to pre-heat the air entering the air inlet tube 21. Such pre-heating is easily accomplished by having a simple heat exchanger to capture exhaust heat and preheat intake air entering the system. The preheating components are not shown.

Figure 2:
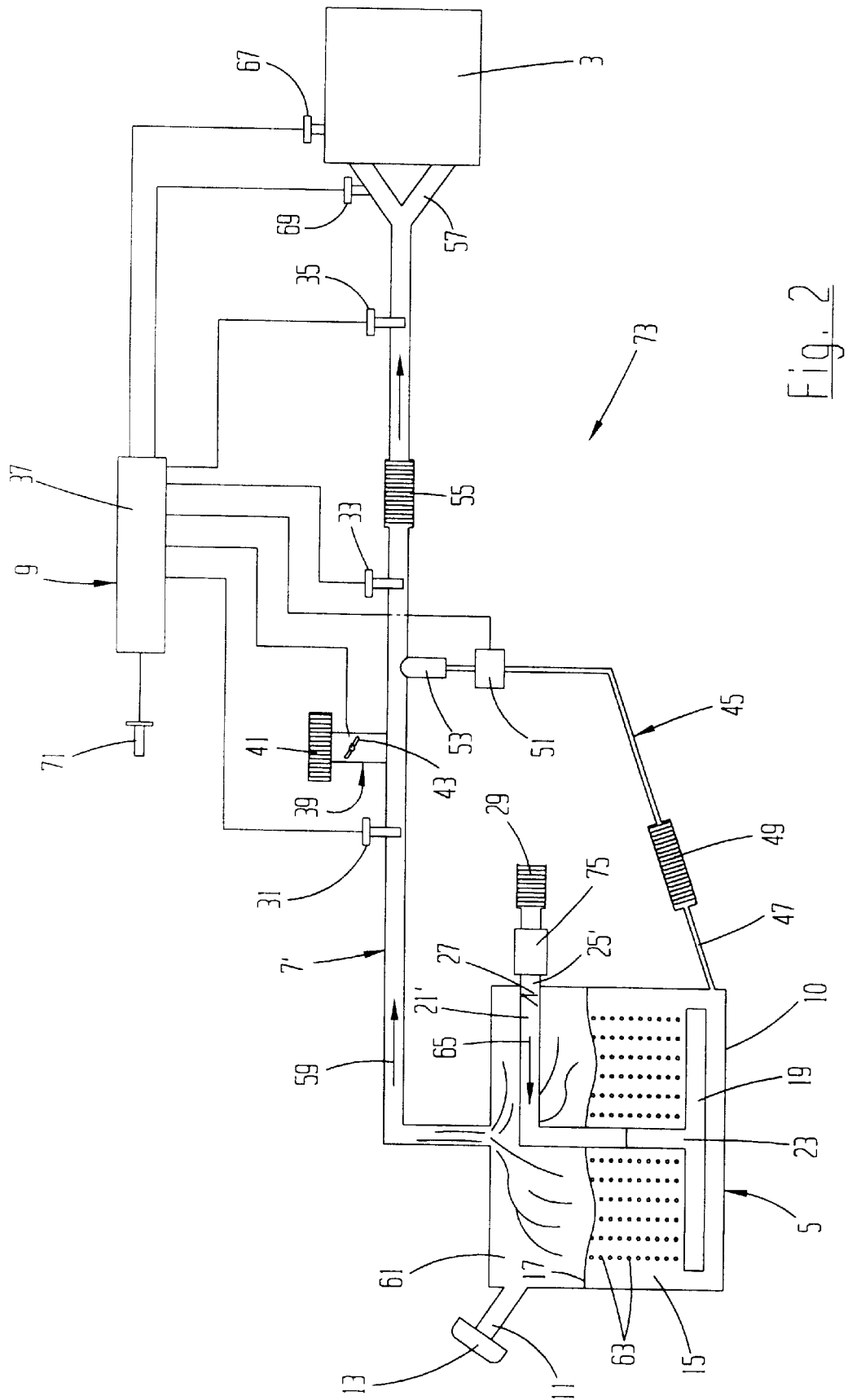
FIG. 2 is a schematic diagram of a modified embodiment of the invention.

Further in accordance with the present invention, accessory equipment can easily be added to the fuel vapor system 1. Looking at FIG. 2, a fuel vapor system 73 is shown that is generally similar to the system 1 of FIG. 1. The system 73 has a blower 75 at the upstream end 25' of the air inlet tube 21'. The blower 75 produces a positive pressure in the fuel vapor passage 7', which may be desirable in some applications.

The fuel vapor systems 1 and 73 of the invention have numerous advantages over conventional carburetor and direct injection systems. Some of the advantages are the fact that moisture in either the fuel 15 or inside the reservoir 5 do not affect the systems. Similarly, dirt and other contaminants in the fuel, bubble pan 19, or reservoir 5 does not affect the systems. The fuel tank can be located at any location in a vehicle, and it may be of any shape that enhances the safety and convenience of the particular vehicle. The ability of the systems to deliver the ideal air/fuel ratio at all times and under different operating and atmospheric conditions results in smooth running, low emissions, high power output, and high efficiency for the engine.

In summary, the results and advantages of internal combustion engines can now be more fully realized. The fuel vapor system provides both an ideal air/fuel ratio to the engine as well as the ability to constantly change the air/fuel ratio in response to changing conditions. This desirable result comes from using the combined functions of the auxiliary air inlet 39 and the auxiliary fuel inlet 45. The auxiliary air inlet and the auxiliary fuel inlet cooperate with each other and with the control 9 to assure delivery of the ideal air/fuel ratio to the engine 3. The fuel vapor is created initially by the action of the air bubbles 63 passing through the reservoir fuel 15. The original air/fuel ratio in the reservoir space 61 is changed by the auxiliary air inlet and the auxiliary fuel inlet as commanded by the control. The control constantly updates the ideal air/fuel ratio by monitoring the atmosphere and engine operating conditions. Consequently, the air/fuel ratio is also changed as necessary to suit the conditions at hand.

It will also be recognized that in addition to the superior performance of the fuel vapor system, its construction is such as to cost little, if any, more than traditional fuel delivery systems. Also, because the fuel vapor system is constructed of a rugged but simple design, it gives long service life with minimal maintenance.

Thus, it is apparent that there has been provided, in accordance with the invention, a fuel vapor system that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A fuel vapor system for an internal combustion engine that creates a vacuum during operation comprising:
    a. a reservoir that holds liquid fuel and that has a space above the fuel;
    b. a bubble pan under the fuel in the reservoir, the bubble pan defining a multiplicity of small holes;
    c. an air inlet tube that connects the bubble pan to the atmosphere;
    d. a fuel vapor passage leading from the space in the reservoir to the engine, the engine drawing fuel vapor having a first air/fuel ratio from the space in the reservoir in a downstream direction through the fuel vapor passage during operation and thereby drawing air through the air inlet and the bubble pan and through the fuel in the reservoir to the space in the reservoir to vaporize some of the fuel to the first air/fuel ratio; and
    e. means for changing the first air/fuel ratio in the fuel vapor passage to deliver a predetermined air/fuel ratio to the engine, wherein the means for changing the first air/fuel ratio in the vapor passage comprises:
        i. means for sensing the first air/fuel ratio;
        ii. means for introducing auxiliary air into the fuel vapor passage;
        iii. means for introducing auxiliary fuel into the fuel vapor passage;
        iv. means for controlling the means for introducing auxiliary air and the means for introducing auxiliary fuel to change the first air/fuel ratio to the predetermined air/fuel ratio; and
        v. means for sensing the predetermined air/fuel ratio.

2. The fuel vapor system of claim 1 wherein:
    a. the means for sensing the predetermined air/fuel ratio comprises at least one sensor in the fuel vapor passage that measures the predetermined air/fuel ratio;
    b. the means for introducing auxiliary air comprises an auxiliary air inlet at a location in the fuel vapor passage that is upstream from said at least one sensor; and
    c. the means for introducing auxiliary fuel comprises means for injecting liquid fuel into the fuel vapor passage at a location that is upstream from said at least one sensor.

3. The fuel vapor system of claim 2 wherein the means for controlling comprises computer means for cooperating with said at least one sensor to control the auxiliary air inlet and the auxiliary fuel inlet to introduce auxiliary air and auxiliary fuel, respectively, into the fuel vapor passage and thereby change the first air/fuel ratio to the predetermined air/fuel ratio in the fuel vapor passage.

4. The fuel vapor system of claim 1 wherein the means for sensing the first air/fuel ratio comprises a first sensor that measures the first air/fuel ratio in the fuel vapor passage upstream of the means for introducing auxiliary air and of the means for introducing auxiliary fuel.

5. Apparatus for delivering fuel to an internal combustion engine that creates an engine vacuum during operation comprising:
    a. a reservoir having fuel therein and a reservoir space above the fuel;
    b. means for evaporating the fuel at a first air/fuel ratio into the reservoir space;
    c. a fuel vapor passage between the reservoir space and the engine such that the engine vacuum draws the evaporated fuel at the first air/fuel ratio from the reservoir space in a downstream direction into the fuel vapor passage and toward the engine;
    d. an auxiliary air inlet in the fuel vapor passage;
    e. an auxiliary fuel inlet in the fuel vapor passage; and
    f. means for controlling the auxiliary air inlet and the auxiliary fuel inlet to change the first air/fuel ratio to a second air/fuel ratio,
        so that fuel with the second air/fuel ratio is delivered toward the engine.

6. The apparatus of claim 5 wherein the means for evaporating the fuel comprises:
    a. a bubble pan that defines a multiplicity of small holes submerged in the fuel in the reservoir; and
    b. an air inlet tube connecting the bubble pan to the atmosphere,
        so that the engine vacuum draws atmospheric air through the air inlet tube, the bubble pan, and the fuel to evaporate the fuel at the first air/fuel ratio into the reservoir space.

7. The apparatus of claim 6 wherein the means for evaporating the fuel further comprises valve means for admitting atmospheric air into the air inlet tube when an engine is operating and for blocking atmospheric air from entering the air inlet tube when the engine is not operating.

8. The apparatus of claim 6 further comprising means for blowing atmospheric air into the air inlet tube to produce a positive pressure in the fuel vapor passage.

9. The apparatus of claim 5 wherein the means for controlling the auxiliary air inlet and the auxiliary fuel inlet comprises:

a. a first sensor that measures the first air/fuel ratio;

b. a second sensor in the fuel vapor passage between the auxiliary fuel inlet and the engine that measures the second air/fuel ratio; and c. computer means for comparing the second air/fuel ratio with an ideal air/fuel ratio and for controlling the auxiliary air inlet and the auxiliary fuel inlet to change the first air/fuel ratio to the second air/fuel ratio in response to the first air/fuel ratio being unequal to the ideal air/fuel ratio.

10. The apparatus of claim 9 further comprising:

a. an air/fuel mixer in the fuel vapor passage between the second sensor and the engine; and b. a third sensor in the fuel vapor passage that is downstream of the air/fuel mixer, the third sensor measuring the second air/fuel ratio in the fuel vapor passage in the downstream direction from the air/fuel mixer.

11. The apparatus of claim 5 wherein the means for controlling comprises means for calculating an ideal air/fuel ratio and for controlling the auxiliary air inlet and the auxiliary fuel inlet to change the first air/fuel ratio to the second air/fuel ratio in response to the first air/fuel ratio being compared with the ideal air/fuel ratio.

12. The apparatus of claim 11 wherein the second air/fuel ratio is equal to the ideal air/fuel ratio.

13. A method of delivering fuel to an internal combustion engine comprising the steps of:

a. evaporating fuel at a first air/fuel ratio into a space;

b. drawing the fuel at the first air fuel ratio in a downstream direction toward the engine through a fuel vapor passage between the space and the engine;

c. comparing the first air/fuel ratio with an ideal fuel ratio;

d. changing the first air/fuel ratio to [an] the ideal air/fuel ratio in response to comparing the first and ideal air/fuel ratios comprising the steps of:
     i. measuring the first air/fuel ratio at a first location in the fuel vapor passage; and
     ii. changing the first air/fuel ratio to the ideal air/fuel ratio downstream of the first location; and e. delivering the fuel at the ideal air/fuel ratio to the engine.

* * * * *